United States Patent [19]
Baversten

[11] Patent Number: 5,227,123
[45] Date of Patent: Jul. 13, 1993

[54] CORE INSTRUMENT CUTTING SYSTEM

[75] Inventor: Bengt I. Baversten, Simsbury, Conn.

[73] Assignee: Combustion Engineering, Inc., Windsor, Conn.

[21] Appl. No.: 788,962

[22] Filed: Nov. 7, 1991

[51] Int. Cl.$^5$ ............................................. G21C 19/00
[52] U.S. Cl. ...................................... 376/260; 83/930
[58] Field of Search .................. 376/260, 261, 272; 83/930, 923

[56] References Cited

U.S. PATENT DOCUMENTS

| | | | |
|---|---|---|---|
| 4,223,581 | 9/1980 | Markiewicz | 376/260 |
| 4,377,551 | 3/1983 | Adams | 376/260 |
| 4,664,872 | 5/1987 | Kiewitz et al. | 376/260 |

Primary Examiner—Daniel D. Wasil
Attorney, Agent, or Firm—John H. Mulholland

[57] ABSTRACT

A method of removing in-core instruments and dry tubes from a boiling water reactor during a refueling outage wherein a pair of temporary storage containers are provided in the reactor core. A remotely operated cutting device is superposed on the first temporary storage container. An instrument is suspended by an end, with the in-core part uppermost, and lowered until a portion of the out-of-core part is within the first temporary storage container. The cutting device is then operated to sever the instrument portion within the temporary storage container. The instrument is repeatedly lowered, and portions severed, until all of the out-of-core part of the instrument is in the first temporary container. The in-core part of the instrument is then lowered into the second temporary container and the two temporary containers are removed from the reactor cavity using the existing equipment-handling crane.

2 Claims, 1 Drawing Sheet

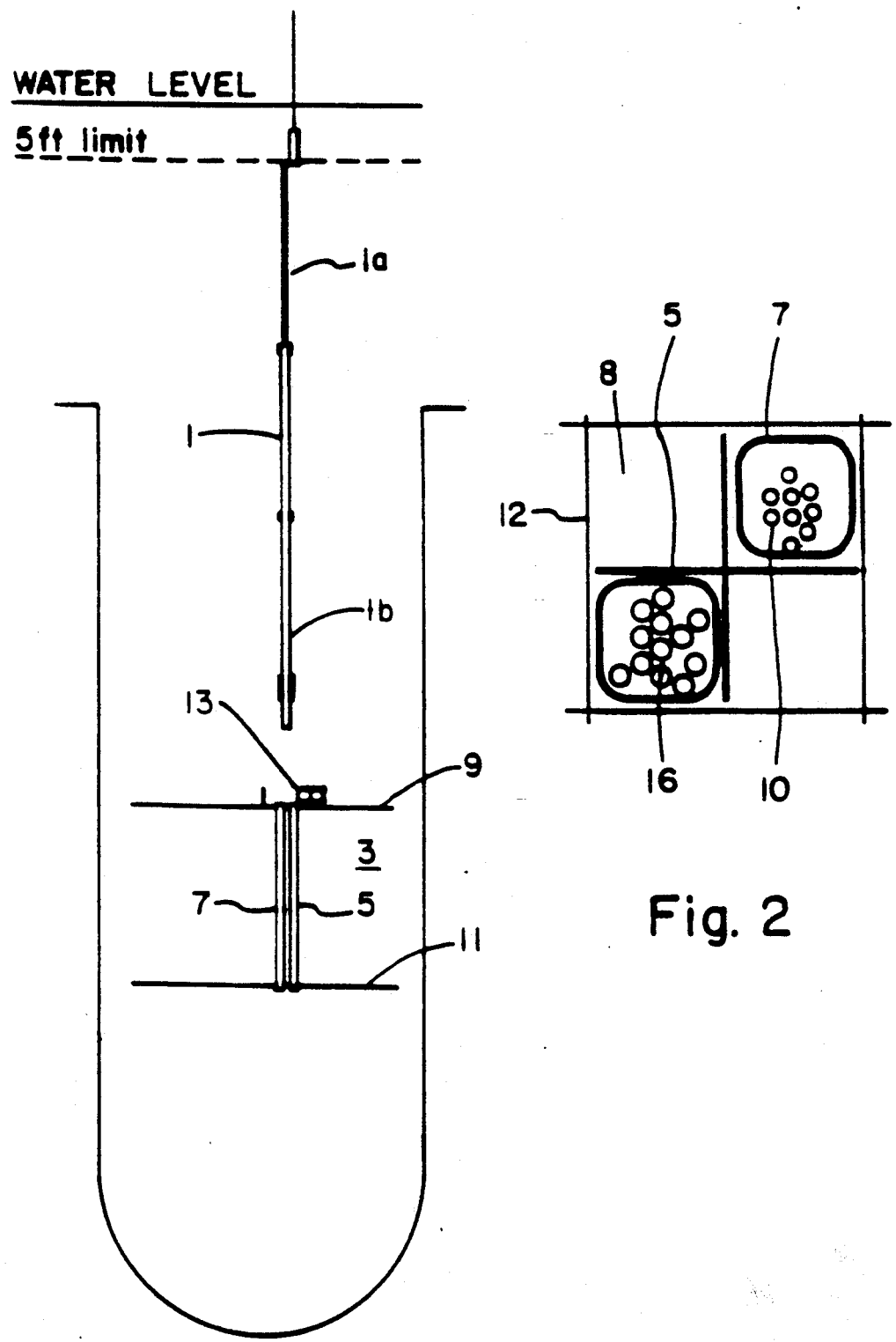

CORE INSTRUMENT CUTTING SYSTEM

BACKGROUND AND SUMMARY OF THE INVENTION

The present invention pertains to nuclear reactors and, more particularly, to a method of safely removing in-core instruments and SRM/IRM dry tubes from a boiling water reactor (BWR) during a refueling outage.

In-core instruments and dry tubes are commonly replaced during refueling outages of boiling water reactors. The used instruments and tubes are removed from the reactor vessel and scrapped. Since they have become radioactive, they must at all times during removal be kept beneath at least a certain amount of shielding water. This shielding requirement is especially important with respect to the in-core portions, approximately the upper 15 feet, of the instruments and tubes. Removal is further complicated by the extreme length of the items, approximately 42 feet, and space limitations within the reactor cavity.

Present removal methods involve bending the instruments and tubes double, or dragging them at an angle, so that they may be removed to an adjacent, water-filled equipment pool where they are cut into sections of a more convenient length. These methods are time consuming. Further, dragging members through the reactor vessel may create contamination problems.

It is, therefore, an object of the present invention to provide a safe and convenient method of removing excessively lengthy members, such as in-core instruments and dry tubes, from a boiling water reactor during a refueling outage.

The foregoing and other objects and advantages as may hereinafter appear are achieved by a method wherein a temporary storage container is provided within the reactor cavity, preferably within the reactor core, having a remotely operated cutting device superposed thereon. The elongate member is suspended by an end, with the in-core part uppermost, above the temporary storage container and lowered until a portion of the member is within the container. The cutting device is then operated to sever the portion of the member within the container. The steps, of lowering a portion of the elongate member into the temporary storage container and of then severing that portion, are repeated a desired number of times until all of the out-of-core part of the member is in the temporary container. The temporary storage container and the in-core part of the elongate member may now be removed from the reactor cavity in the manner conventionally utilized for items with these radioactivity levels.

Preferably, a second temporary storage container is provided, proximate the first one, into which the in-core part of the elongate member may be lowered. Removal of the in-core part of the member is then effected by removing the second temporary storage container.

BRIEF DESCRIPTION OF THE DRAWINGS

FIG. 1 is a simplified schematic cross-sectional view of the reactor cavity of a boiling water reactor; and FIG. 2 is a schematic top plan view of a section of the reactor core.

DESCRIPTION OF THE PREFERRED EMBODIMENT

Turning now to the drawings, there is shown, in FIG. 1 an elongate in-core instrument 1, in this case a LPRM detector, which comprises an in-core part 1a, approximately 15 feet in length, which is of relatively higher radioactivity, and an out-of-core part 1b, approximately 27 feet in length, which is of relatively lower radioactivity. Instrument 1 has been withdrawn from its operative position in the reactor core 3 by conventional means and is suspended, by an end, from a conventional equipment-handling crane (not shown), with in-core part 1a uppermost.

First and second temporary storage containers 5 and 7 respectively, are provided in reactor core 3. Temporary storage containers 5 and 7 have outer dimensions substantially identical to either a control rod blade guide (as illustrated) or a core grid cell of one control rod and four fuel assembles 12. Temporary storage containers 5 and 7 extend between and are temporarily supported by top guide 9 and fuel support plate 11. A remotely operated cutting device 13 is superposed on first temporary storage container 5.

Instrument 1, which has been vertically aligned with first temporary storage container 5, is lowered until a portion of out-of-core part 1b is therein. Cutting device 13 is then operated to sever the portion of instrument 1 which is within first temporary storage container 5. Instrument 1 is then lowered further, until another portion of out-of-core part 1b is within first temporary storage container 5, and cutting device 13 is again operated to sever the instrument portion within the container. This proceeding is repeated until all of the out-of-core part 1b of instrument 1 is in first temporary storage container 5. Preferably, out-of-core part 1b is cut into three pieces.

With out-of-core part 1b thus removed, the remainder of instrument 1, i.e., in-core part 1a, is lowered into second temporary storage container 7.

Both temporary storage containers 5 and 7 may now be removed from reactor core 3 by the equipment-handling crane.

It is to be noted that the entire instrument removal procedure has been performed beneath the protective water shield and, more particularly, beneath a minimum 5 foot depth.

While the invention has been described with reference to the preferred embodiment, it is to be understood that various changes and modifications may be made thereto without departing from the spirit and contemplation of the invention. For example, a second cutting device may be disposed on second temporary storage container so as to permit cutting the in-core part 1a of instrument 1 into sections, in the manner of out-of-core part 16. Alternatively, after severance of out-of-core part 1b from instrument 1, in-core part 1a may be removed from the reactor cavity directly, without use of a temporary storage container. The scope of the invention, therefore, is intended to be limited only by the appended claims.

I claim:

1. A method of removing an elongate member from a nuclear reactor during a refueling outage, said elongate member comprising a first part of relatively higher radioactivity and a second part of relatively lower radioactivity, said method comprising the steps of:

a. providing first and second temporary storage containers within the reactor core;
b. providing a remotely operated cutting device superposed on said first temporary storage container;
c. suspending said elongate member by an end thereof, with said first part uppermost, above said first temporary storage container;
d. lowering said elongate member until a portion of said second part is within said first temporary storage container;
e. operating said cutting device to sever said portion of said second part within said first temporary storage container;
f. repeating steps d. and e. a desired number of times until all of said second part of said elongate member is within said first temporary storage container;
g. placing said first part of said elongate member in said second temporary storage container; and
h. removing said first and second temporary storage containers from said reactor corer.

2. The method of claim 1, wherein steps d. and e. are each performed three times.

* * * * *